(12) United States Patent
Riedl

(10) Patent No.: US 11,167,535 B2
(45) Date of Patent: Nov. 9, 2021

(54) MULTI-LAYER FILM STACK AND CARD-SHAPED DATA CARRIER

(71) Applicant: GIESECKE+DEVRIENT MOBILE SECURITY GMBH, Munich (DE)

(72) Inventor: Josef Riedl, Attenkirchen (DE)

(73) Assignee: GIESECKE+DEVRIENT MOBILE SECURITY GMBH, Munich (DE)

( * ) Notice: Subject to any disclaimer, the term of this patent is extended or adjusted under 35 U.S.C. 154(b) by 220 days.

(21) Appl. No.: 16/322,299

(22) PCT Filed: Jun. 28, 2017

(86) PCT No.: PCT/EP2017/000768
§ 371 (c)(1),
(2) Date: Jan. 31, 2019

(87) PCT Pub. No.: WO2018/024351
PCT Pub. Date: Feb. 8, 2018

(65) Prior Publication Data
US 2019/0176444 A1    Jun. 13, 2019

(30) Foreign Application Priority Data
Aug. 1, 2016  (DE) .................. 10 2016 009 307.2

(51) Int. Cl.
*B32B 27/08*  (2006.01)
*B32B 27/36*  (2006.01)
*B32B 27/20*  (2006.01)

(52) U.S. Cl.
CPC .............. *B32B 27/08* (2013.01); *B32B 27/20* (2013.01); *B32B 27/36* (2013.01); *B32B 27/365* (2013.01); *B32B 2270/00* (2013.01); *B32B 2307/4026* (2013.01); *B32B 2307/75* (2013.01); *B32B 2425/00* (2013.01)

(58) Field of Classification Search
CPC ........ B32B 2270/00; B32B 2307/4026; B32B 2307/75; B32B 2425/00; B32B 27/08; B32B 27/20; B32B 27/36; B32B 27/365
See application file for complete search history.

(56) References Cited

U.S. PATENT DOCUMENTS

| | | | |
|---|---|---|---|
| 8,322,752 B2 | 12/2012 | Sakagami et al. |
| 8,603,633 B2 | 12/2013 | Sakagami et al. |
| 9,676,133 B2 | 6/2017 | Riedl et al. |
| 9,796,122 B2 | 10/2017 | Riedl et al. |
| 2011/0069134 A1 | 3/2011 | Sakagami et al. |
| 2011/0076452 A1 | 3/2011 | Sakagami et al. |

(Continued)

FOREIGN PATENT DOCUMENTS

| | | |
|---|---|---|
| CN | 102046377 A | 5/2011 |
| CN | 102046378 A | 5/2011 |

(Continued)

OTHER PUBLICATIONS

Office Action from corresponding CN Application No. 201780045692. 3, dated May 9, 2020.

(Continued)

*Primary Examiner* — Lawrence D Ferguson
(74) *Attorney, Agent, or Firm* — Workman Nydegger

(57) ABSTRACT

A multilayer, co-extruded foil stack has a layer of a layer having Tritan® and a layer arranged within the foil stack with a layer having polycarbonate. A card-shaped data carrier has at least the multilayer foil stack.

20 Claims, 1 Drawing Sheet

(56) References Cited

U.S. PATENT DOCUMENTS

| | | |
|---|---|---|
| 2012/0328865 A1 | 12/2012 | Riedl et al. |
| 2014/0166183 A1 | 6/2014 | Riedl et al. |
| 2015/0010741 A1 | 1/2015 | Pham et al. |
| 2016/0031144 A1 | 2/2016 | Riedl et al. |

FOREIGN PATENT DOCUMENTS

| | | |
|---|---|---|
| CN | 102811856 A | 12/2012 |
| CN | 105492328 A | 4/2016 |
| EP | 2725063 A1 | 4/2014 |
| EP | 2927881 A1 | 10/2015 |
| JP | 2000-200329 A | 7/2000 |
| JP | 2013001087 A | 1/2013 |
| JP | 2013001089 A | 1/2013 |
| JP | 2013001090 A | 1/2013 |
| JP | 2015131407 A | 7/2015 |
| WO | 2015003077 A1 | 1/2015 |

OTHER PUBLICATIONS

International Preliminary Report on Patentability from PCT Application No. PCT/EP2017/000768, dated Feb. 5, 2019.
German Search Report from DE Application No. 102016009307.2, dated Mar. 28, 2017.
International Search Report and Written Opinion from PCT Application No. PCT/EP2017/000768, dated Sep. 11, 2017.

MULTI-LAYER FILM STACK AND CARD-SHAPED DATA CARRIER

FIELD OF THE INVENTION

The present invention relates to a multilayer foil stack, which is manufactured by coextrusion and can be used in a laminate stack in order to form card-shaped data carriers.

Card-shaped data carriers can be, for example, payment cards with a contactless and/or contact-type interface, identification cards, discount cards, access cards, employee identification cards, etc.

BACKGROUND OF THE INVENTION

The card-shaped ID data carriers manufactured today and the data pages for identification documents manufactured today are almost exclusively manufactured from polycarbonate (PC). Alternatively, further materials are used in the manufacture, such as, for example, PVC, Teslin, Melinex®, PETG (polyethylene terephthalate), etc.

Polycarbonate has good lasering properties, but polycarbonate is a hard, rigid material, which is chemically not very stable and, under the action of stress, can tend to form cracks, in particular to form micro cracks. In this respect, it is necessary to take additional auxiliary measures in the case of data carriers formed from polycarbonate, in order to ensure a long-term stability of the data carrier. For this purpose, in particular measures for avoiding cracks in the region of the module, i.e. of the chip, and also coating with additional foils are required. Even if such measures are applied, it is not guaranteed that sufficient long-term stability of the data carrier is achieved.

A data carrier emerges from EP 2 927 881 A1 in which a core ply can be formed from polycarbonate, Tritan® or Teslin. Advantageous properties of the Tritan® are not explained further, since the main focus of this application is aimed at the application of a lenticular element structure to at least a part of the surface of the data carrier EP 2 725 063 A1 discloses a method for manufacturing a foil blend. According to the method, various compositions are mixed to form a blend layer, wherein the individual compositions are strongly mixed with one another.

Tritan® foils have the disadvantage that they can be lasered with high contrast very poorly. This means that laser personalization is not possible to a satisfactory degree.

SUMMARY OF THE INVENTION

The object of the invention is to make available a multilayer foil stack and a card-shaped data carrier that solve the known problems from the prior art and are further suitable for making available a durable and at the same time lasering-capable foil stack.

The object is achieved by the subject matter of the independent patent claims. Preferred embodiments of the subject matter of the invention result from the dependent claims.

The invention is based on the basic idea that lasering-capable and non-lasering-capable substances are to be combined in a skillful manner in a foil stack, in order to form a durable and at the same readily lasering-capable foil stack.

This object is achieved according to a multilayer, coextruded foil stack with at least one respectively outwardly disposed layer from a layer having Tritan® and a proportion of PETG and a layer arranged within the outwardly disposed layers with a layer having polycarbonate.

The outwardly disposed layer of a layer having Tritan® and a proportion of PETG is understood to mean a layer which at least partially has Tritan® and PETG proportions or which is formed up to 100 wt.-% from Tritan® and PETG. A layer which consists only partially of Tritan®, can, for example, additionally have PETG and additional processing aids, such as release and anti-blocking additives. PETG advantageously improves the bond between the further layers.

The "outwardly disposed layer" is to be understood such that in the multilayer foil stack a multiplicity of foils can be employed, wherein the layer having the Tritan® is employed as the respectively outermost layer of the foil stack. Alternatively, the "outwardly disposed layer" is to be interpreted such that at least one further layer, i.e. the layer with the layer having polycarbonate, is arranged between the outwardly disposed layers.

The layer having polycarbonate is arranged between the layers having the Tritan® and a proportion of PETG, i.e. within the outwardly disposed layers. The layer having polycarbonate can be admixed with additional constituents, such as, for example, Tritan®, PETG, PC, PVC, ABS, etc.; alternatively, the layer having polycarbonate can have exclusively polycarbonate.

With the multilayer foil stack according to the invention, it is particularly advantageously possible to make available a foil stack which is both durable and lasering-capable. The layers having Tritan® and a proportion of PETG which are located on the outer side of the foil stack ensure good longevity or durability of both the layer having Tritan® and the layer having polycarbonate, since the layer having polycarbonate is "locked" or arranged between the "Tritan® layers", such that influences from the outside or chemicals, bending stress, UV radiation, cannot exert any influence on the polycarbonate and, accordingly, no micro cracks can occur in the polycarbonate layer. Furthermore, it is possible to laser the layer having polycarbonate readily.

According to one embodiment, the foil having polycarbonate can have a proportion of Tritan®. In this manner, both the durable properties and the lasering-capable properties of the two substances can be combined particularly advantageously by the blend of polycarbonate and Tritan®.

According to the invention, the layer having Tritan® has a proportion of PETG, in particular a polyethylene terephthalate modified with glycol. By adding PETG to the Tritan®, it is possible to reduce the costs for this layer, since PETG can be purchased more inexpensively than Tritan® at the moment.

The foil stack is manufactured by means of coextrusion. In this manner, it is efficiently possible to produce large quantities of the foil stack at high speed, without a mixing occurring between the individual layers.

According to a preferred embodiment, the foil stack has a layer thickness of maximally 200 μm, preferably maximally 100 μm.

In order to improve the lasering capability of the foil having polycarbonate or of any layer having polycarbonate, the foil or the layer can be doped with laser additives. Particularly preferably, powdery pigments and/or pigment granulates can be used in this case.

The foil stack can be executed opaquely and/or transparently. By correspondingly varying the additives of the respective layer of the foil stack, said stack can be caused to become opaque or transparent.

Further, the advantages according to the invention are effective in a multilayer foil stack having at least respectively one outwardly disposed layer of a layer having Tritan®, and a layer arranged between the outwardly disposed layers with a layer having Tritan® and an inorganic filler, in particular titanium dioxide. Tritan shows outstanding properties in connection with the inorganic filler, in particular with titanium dioxide. The foil stack can also be freely combined with features of the previous embodiments.

The advantages according to the invention likewise result when the invention is applied in a card-shaped data carrier, which can also include a data page of a passport book or a card in the check card format, having the multilayer foil stack described above. In this manner, it is particularly advantageously possible to make available a durable and simultaneously lasering-capable foil stack.

According to one embodiment, the laminate stack of the data carrier comprises at least two of the multilayer, above-mentioned foil stacks, wherein the outermost layer of the laminate stack is the layer having Tritan® in each case. In other words, the outwardly facing layer, thus the layer arranged on the two "visible sides" is the foil or layer having Tritan® in each case. In this manner, a formation of cracks in the outwardly disposed layer of the data carrier can advantageously be avoided.

DETAILED DESCRIPTION OF PREFERRED EMBODIMENTS OF THE INVENTION

The invention is described in the following with reference to embodiment examples. The layers shown in the figures are not shown true to scale and can be varied as desired in terms of their thickness, so that layers which are represented as comparatively thin can even be thicker in the implemented variant of the invention than the layers represented as comparatively thinner and vice versa.

Figure 1:
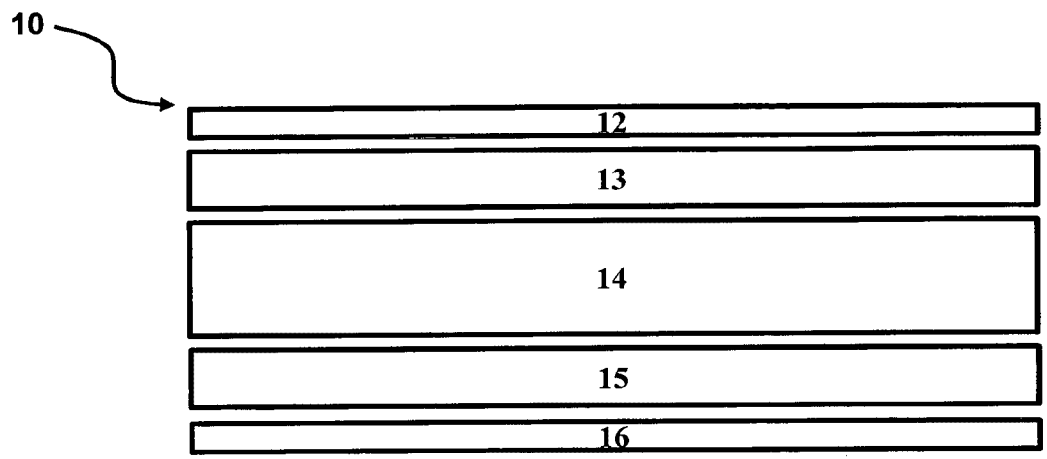
FIG. 1 shows a multilayer foil stack according to the invention according to a first embodiment.

FIG. 1 shows a multilayer, coextruded foil stack 10 with respectively one outwardly disposed layer 12, 16 of a layer having Tritan®. Between the outwardly disposed layers 12, 16 of the layer having Tritan® there is arranged at least one inner layer 14 which is formed from a foil having polycarbonate. The remaining layers 13 and 15 are optional.

The outwardly disposed layers 12, 16 are very durable since they are formed from a foil having Tritan®. Tritan® is a material which usually comprises the following constituents:

Three monomers, di-methyl terephthalate (DMT), 1,4-cyclohexanedimethanol (CHDM), and 2,2,4,4-tetramethyl-1,3-cyclobutanediol (TMCD) with different proportions.

In order to reduce the costs of the layer and of the coextruded foil stack, PETG can be added to the layer having Tritan®, while the advantageous properties are maintained at the same time. Further, processing additives such as, for example, release- and anti-blocking additives and laser additives known in the prior art, can be admixed.

The layer 14 arranged within the outwardly disposed layers 12, 16 has polycarbonate. Polycarbonate can be lasered readily. Good lasering properties are thus obtained. The layer 14 can optionally additionally have Tritan®, inorganic fillers, such as, for example, titanium dioxide and PETG. Further, according to an embodiment, PVC and/or ABS can be added. According to an alternative embodiment, the layer 14 can have Tritan® and an inorganic filler, in particular titanium dioxide.

The layers having polycarbonate, in particular the layer 14, can each be doped with at least one laser additive. For example, powdery pigments can be employed, which trigger a color change in the polymer itself, or pigment granulates can be employed as laser additive which function independently of the polymer, since they are themselves already equipped with a polymer, so to speak. Further, laser additives can be provided in the layers 12, 16 of a foil having Tritan®. These have a particularly advantageous effect if polycarbonate is additionally present in the layers 12, 16 of a foil having a Tritan®.

Between the layers 12 and 14 and between the layers 14 and 16, further layers 13 and 15 can be provided in any desired number. These layers can, for example, likewise have a polycarbonate, a mixture of polycarbonate and Tritan®, and a mixture of polycarbonate and PETG. However, the proportion of polycarbonate in the layers 13 and 15 is preferably smaller than in the layer 14.

The multilayer foil stack 10 can be formed both to be both opaque and to be transparent. In other words, each individual one of the foils can be formed to be opaque and/or transparent according to requirements.

The foil stack 10 is manufactured by a coextrusion process. For this purpose, melt flows of the individual layers 12-16 are formed, which are separated in a feed block and are subsequently joined in accordance with the desired structure of the foil stack, so that, in the case of a preferably symmetrical structure of the foil stack 10, the respective layers are laid one above the other starting from the "center" of the foil stack 10.

The layer equipped with the laser additives is usually more highly doped than the layer disposed thereabove (in the direction of the laser action).

The foil stack can furthermore be structured as follows: A multilayer foil stack 10 having at least respectively one outwardly disposed layer 12, 16 of a layer having Tritan® (alternatively Tritan® and PETG), and a layer 14 arranged between the outwardly disposed layers that has a layer having Tritan® and an inorganic filler, in particular titanium dioxide. The foil stack can be manufactured by coextrusion. Further layers in the stack are possible, in particular, further layers according to the above-mentioned embodiments are possible. The layers 13 and 15 can be formed of polycarbonate and can be formed to be transparent.

Figure 2:
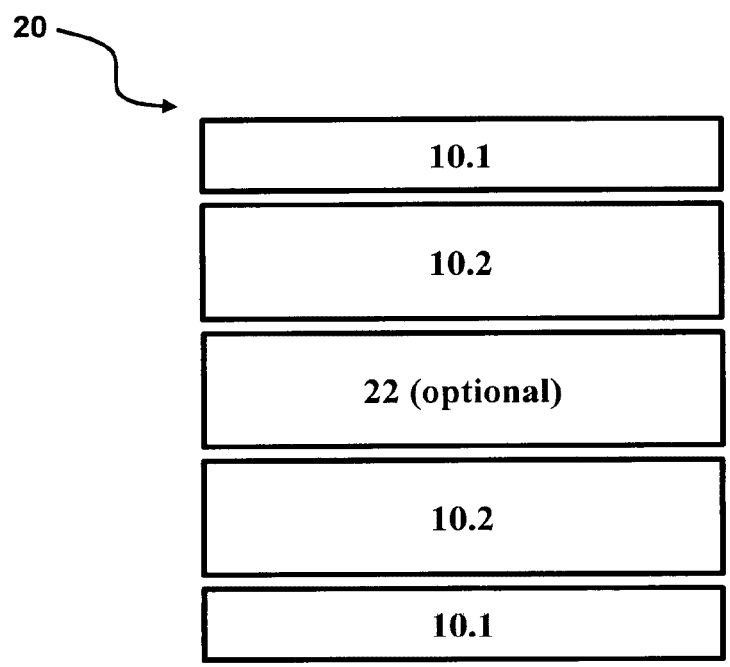
FIG. 2 shows a data carrier according to the invention according to a further embodiment.

The data carrier 20 shown in FIG. 2 has a multiplicity of foil stacks 10.1, 10.2 and 22. As can already be seen from the reference numbers 10.1 and 10.2, these foil stacks are modifications or variants of the foil stack 10 shown in FIG. 1. For example, the foil stack 10.1, which comes to bear respectively on the outer side of the data carrier 20, is a transparent foil stack and the foil stack 10.2 is an opaque foil stack. By means of the correspondingly adjusted laser, it is possible to laser into the foil having polycarbonate (or the laser additives arranged there) in different depths in the respective foil stacks 10.1 and/or 10.2. Optionally, between the foil stacks 10.1, 10.2 and 10.2, 10.1, an optional foil stack 22 for filling the data carrier 20 can be arranged, so that said data carrier has the required thickness after the lamination of the foil stack.

In the case without the foil/layer 22, the foil stack 20 can have the foil stacks 10.2 twice. Alternatively, said foil stacks 10.2 can be formed only once.

According to the invention, however, it is necessary that when viewing from the outside into the foil stack, i.e.

respectively on the "visible side" of the data carrier, the outermost layer 12, 16 is the layer having Tritan® (alternatively Tritan® and PETG) in each case. As a result, the durability of the data carrier 20 is improved. The layer having polycarbonate which is disposed thereunder can be lasered particularly advantageously.

The layer thickness of the foil stack 10 amounts to maximally 200 µm, preferably maximally 100 µm.

The data carrier 20 can have a chip arranged in the foil stack and a contact-type and/or a contactless interface. The arrangement of a chip and of the above-mentioned interfaces is known in the prior art, for which reason a further description is dispensed with. The data carrier can be used as a payment card and/or as an identification card (ID card).

The invention claimed is:

1. A multilayer, coextruded foil stack comprising:
a first outwardly-disposed layer that includes a portion of a copolyester material and a proportion of polyethylene terephthalate (PETG);
a second outwardly-disposed layer that includes a portion of the copolyester material and a proportion of PETG; and
an inner layer arranged between the first outwardly-disposed and the second outwardly-disposed layer, the inner layer including polycarbonate.

2. The foil stack according to claim 1, wherein the first outwardly-disposed layer or the second-outwardly disposed layer further includes polyethylene terephthalate modified with glycol.

3. The foil stack according to claim 1, wherein the foil stack has a layer thickness of maximally 200 µm.

4. The foil stack according to claim 1, wherein the inner layer is doped with laser additives, including powdery pigments and/or pigment granulates.

5. The foil stack according to claim 1, wherein the foil stack is opaque and/or transparent.

6. The foil stack according to claim 1, wherein the first outwardly-disposed layer or the second-outwardly disposed layer comprises at least the following ingredients with different proportions: three monomers, di-methyl terephthalate, 1,4-cyclohexanedimethanol, and 2,2,4,4-tetramethyl-1, 3-cyclobutanediol.

7. A multilayer, coextruded foil stack comprising: a first outwardly-disposed layer that includes a portion of a copolyester material and a proportion of PETG; and an inner layer arranged between the first outwardly-disposed and the second outwardly-disposed layer, the inner layer including polycarbonate, wherein between the first outwardly-disposed layer and the inner layer there is arranged at least a first further layer, and between the second outwardly-disposed layer and the inner layer there is arranged at least a second further layer, and wherein the first further layer and the second further layer each includes a polycarbonate, the first further layer and the second further layer each includes a blend of a polycarbonate and the copolyester material, or the first further layer and the second further layer each includes a blend of a polycarbonate and polyethylene terephthalate.

8. The foil stack according to claim 1, wherein between the first outwardly-disposed layer and the inner layer there is arranged at least a first further layer, and between the second outwardly-disposed layer and the inner layer there is arranged at least a second further layer, and, wherein the first further layer and the second further layer each includes polycarbonate and/or a blend of polycarbonate and the copolyester material, and/or a blend of polycarbonate and polyethylene terephthalate.

9. The foil stack according to claim 1, the inner layer including an inorganic filler.

10. A card-shaped data carrier having the multilayer foil stack according to claim 1.

11. The data carrier according to claim 10, wherein a laminate stack of the data carrier comprises at least two of the multilayer foil stacks,
wherein an outermost layer of the laminate stack includes the copolyester material and a proportion of PETG.

12. The foil stack according to claim 1, wherein the first outwardly disposed layer and the second outwardly disposed layer further includes polyethylene terephthalate modified with glycol.

13. The foil stack according to claim 7, wherein the first further layer and the second further layer each includes a polycarbonate.

14. The foil stack according to claim 7, wherein the first further layer and the second further layer each includes a blend of a polycarbonate and the copolyester material.

15. The foil stack according to claim 7, wherein the first further layer and the second further layer each includes a blend of a polycarbonate and polyethylene terephthalate.

16. The foil stack according to claim 9, wherein the inorganic filler of the inner layer includes titanium dioxide.

17. A multilayer foil stack comprising:
a first outwardly-disposed layer that includes a portion of a copolyester material and a proportion of polyethylene terephthalate (PETG); a second outwardly-disposed layer that includes a portion of the copolyester material and a proportion of PETG; and
an inner layer arranged between the first outwardly-disposed and the second outwardly-disposed layer, the inner layer including polycarbonate, wherein between the first outwardly-disposed layer and the inner layer there is arranged at least a first further layer, or between the second outwardly-disposed layer and the inner layer there is arranged at least a second further layer, and wherein:
the first further layer or the second further layer includes a polycarbonate,
the first further layer or the second further layer includes a blend of a polycarbonate and the copolyester material, or
the first further layer or the second further layer includes a blend of a polycarbonate and polyethylene terephthalate.

18. The foil stack according to claim 17, wherein the first further layer or the second further layer includes a polycarbonate.

19. The foil stack according to claim 17, wherein the first further layer or the second further layer includes a blend of a polycarbonate and the copolyester material.

20. The foil stack according to claim 17, the first further layer or the second further layer includes a blend of a polycarbonate and polyethylene terephthalate.

* * * * *